United States Patent [19]

Hama et al.

[11] Patent Number: 5,053,064
[45] Date of Patent: Oct. 1, 1991

[54] AIR CONDITIONING APPARATUS FOR A CLEAN ROOM

[75] Inventors: Masaharu Hama; Takaaki Fukumoto, both of Itami, Japan

[73] Assignee: Mitsubishi Denki Kabushiki Kaisha, Tokyo, Japan

[21] Appl. No.: 596,544

[22] Filed: Oct. 11, 1990

[30] Foreign Application Priority Data

Jul. 20, 1990 [JP] Japan .................................. 2-190482

[51] Int. Cl.$^5$ ............................................. B01D 53/30
[52] U.S. Cl. ........................................ 55/270; 55/309; 55/316; 55/385.2; 98/31.5
[58] Field of Search .................... 55/217, 316, 385.2, 55/270, 274, 309, 312; 98/31.5

[56] References Cited

U.S. PATENT DOCUMENTS

| 4,350,504 | 9/1982 | Diachuk | 55/217 |
| 4,514,197 | 4/1985 | Armbruster | 55/316 |
| 4,530,272 | 7/1985 | Stokes | 55/385.2 X |
| 4,603,618 | 8/1986 | Soltis | 98/31.5 |
| 4,699,640 | 10/1987 | Suzuki et al. | 55/385.2 |
| 4,726,824 | 2/1988 | Staten | 98/31.5 X |

Primary Examiner—Charles Hart
Attorney, Agent, or Firm—Leydig, Voit & Mayer

[57] ABSTRACT

An air conditioning apparatus for a clean room has a filter for removing harmful chemicals provided in the return opening of an air-conditioner. In normal operation where there is no chemical leakage, circulating air in the clean room by-passes the filter. When chemicals and the like leak, the circulating air is caused to pass through the filter by operating shutters in order to remove the chemical mist and the like contained in the circulating air.

18 Claims, 3 Drawing Sheets

AIR CONDITIONING APPARATUS FOR A CLEAN ROOM

BACKGROUND OF THE INVENTION

1. FIELD OF THE INVENTION

The present invention relates to an air conditioning apparatus for a clean room, and more particularly to an air conditioning apparatus for a clean room which prevents contamination caused by chemical leakage in the clean room.

2. DESCRIPTION OF THE RELATED ART

FIG. 1 is a cross-sectional view illustrating an example of a conventional air conditioning apparatus for a clean room. In FIG. 1, a circulating air conditioner 2, such as an air blower, for circulating air is provided adjacent to a clean room 1. The air blown by the circulating air conditioner 2 passes through a supply duct 3 of a duct system and is sent into the clean room 1 as pure, fresh air, after having passed through an air conditioning filter 4. The air having thus passed through the inside of the clean room 1 passes through a grating floor 5, a return opening 6 and a return duct 7 of the duct system for adjusting air quantity, and returns to the air conditioner 2. Thus, the air inside the clean room 1 always circulates in the directions indicated by the arrows in FIG. 1.

Facilities 8 for chemical use may be provided in the clean room, and chemicals and the like are supplied to the facilities 8 for chemical use 8 by means of a chemical supply pipe 9.

In such an air conditioning apparatus for a clean room, when chemicals leak from the chemical supply pipe 9 and the like, chemical mist or gas generated from leaked chemicals 20 may be carried in the air circulating in the clean room 1 and then spread throughout the clean room 1 in a short period of time ranging, for example, from seven or eight seconds to several minutes. Accordingly, problems result from such spreading of chemicals such as when toxic chemicals are being used, and negatively affect the physical health of the worker in the clean room 1. When corrosive chemicals are used, the facilities in the clean room 1 will rust.

SUMMARY OF THE INVENTION

The present invention overcomes such problems as the above ones. An object of the invention is to obtain an air conditioning apparatus for a clean room which prevents chemical mist and the like from being diffused into the clean room when chemicals leak.

The present invention provides an air conditioning apparatus for a clean room comprising a circulating air conditioner for circulating air, a supply duct for guiding the air from the circulating air conditioner into the clean room, a return duct for guiding the air circulating in the clean room to the circulating air conditioner, a filter for removing harmful substances which is provided in the return duct and which removes chemicals and the like contained in the air only when chemicals, gas and the like leak in the clean room, and shutters which cover the filter to prevent air from passing through the filter when chemicals and the like do not leak and which, when chemicals and the like leak, cover the return duct in order to cause the air to pass through only the filter.

The above and other objects, features and advantages of the invention will become clear from the following description of the preferred embodiments thereof, taken in conjunction with the accompanying drawings.

DESCRIPTION OF THE PREFERRED EMBODIMENTS

Figure 1:
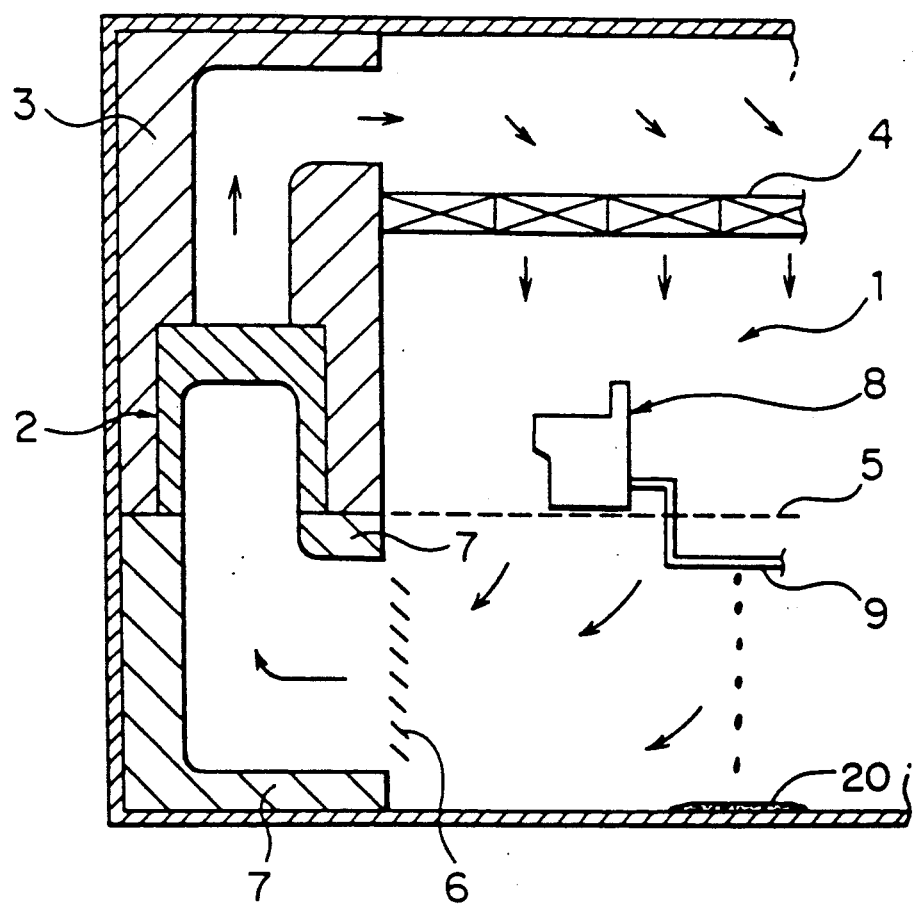
FIG. 1 is a cross-sectional view illustrating a conventional air conditioning apparatus for a clean room.
Figure 2A:
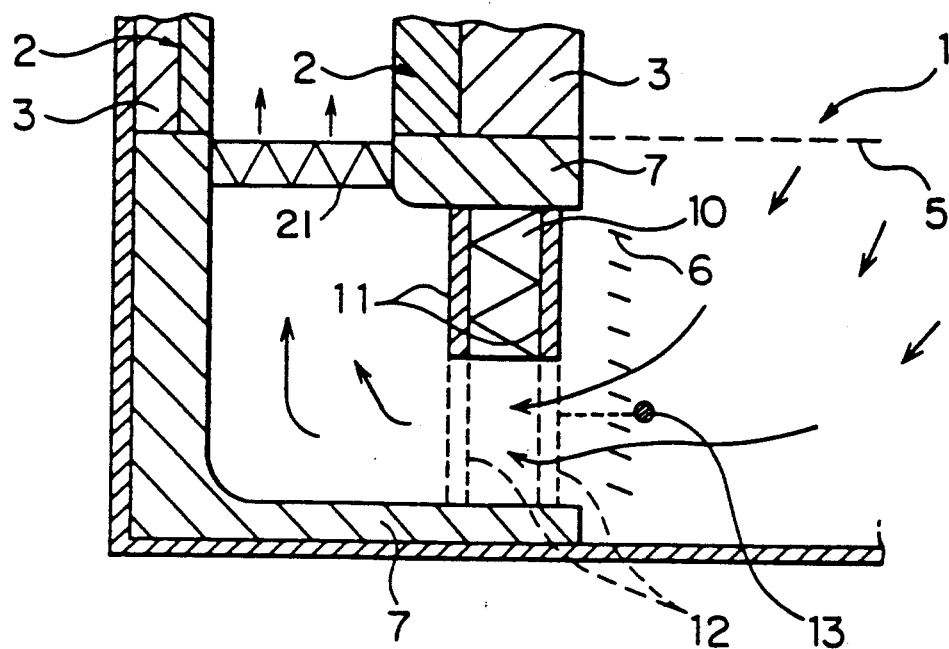
FIGS. 2A and 2B are cross-sectional views of the main parts of an air conditioning apparatus according to an embodiment of the present invention.
Figure 2B:
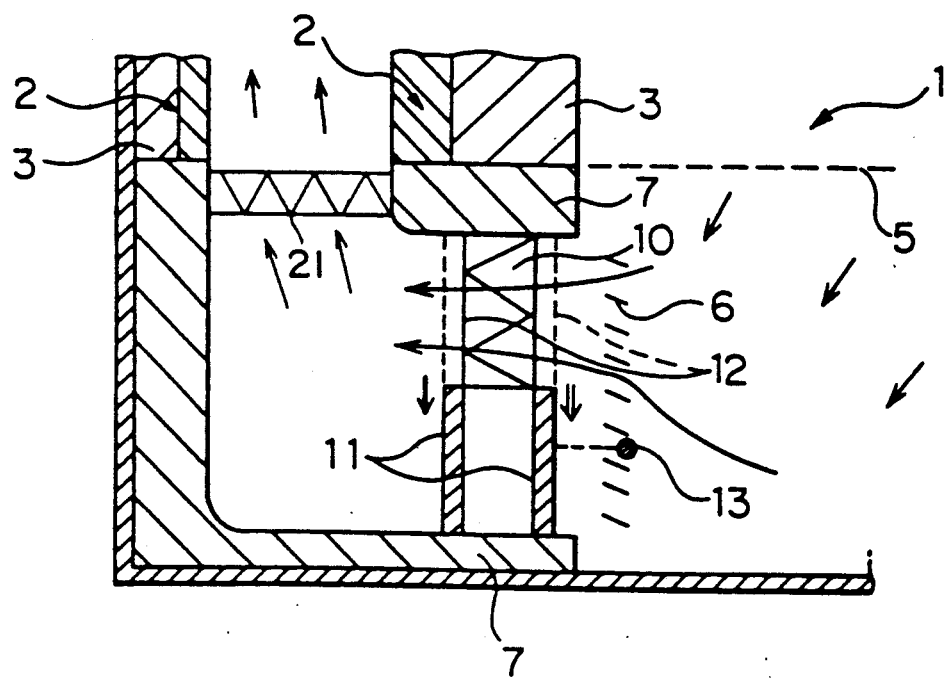
Figure 3:
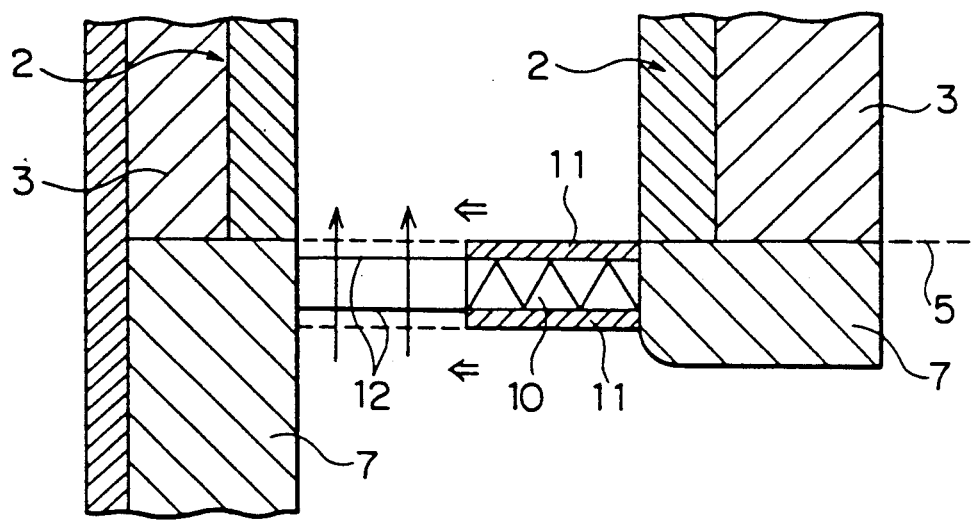
FIGS. 3, 4A and 4B are cross-sectional views of the main parts of an air conditioning apparatus according to another embodiment of the present invention.

FIGS. 2A and 2B are cross-sectional views of the main parts of an air conditioning apparatus according to an embodiment of the present invention. These drawings respectively illustrate the state where the air conditioning apparatus is in operation under normal conditions and the state where it is in operation when chemicals leak. Reference numerals 1 through 3 and 5 through 7 indicate exactly the same components as those described in the conventional air conditioning apparatus. In FIGS. 2A and 2B, filter 10 for removing harmful substances, such as a filter using activated carbon as an agent for removing harmful substances flow control means comprising shutters 11 are provided at the inlet and the outlet of the filter 10 in the return duct 7. The shutters 11 are moved up and down by means of shutter operating means comprising shutter sliding members 12, such as guide rails.

In the air conditioning apparatus constructed as described above, during normal operation when no chemicals and the like leak, as shown in FIG. 2A, the inlet and the outlet of the filter 10 are covered with the shutters 11. Thus, the air returning from the clean room 1 returns as indicated by the arrows via a first flow passage to the circulating air conditioner 2 without having passed through the inside of the filter 10. On the contrary, when chemicals, gas and the like leak in the clean room 1, as illustrated in FIG. 2B, a chemical mist detector 13 detects the leakage, and then the shutters 11 interlocked with the chemical mist detector 13 are caused to move by means of the shutter sliding members 12 in order to open the filter 10. Thus, air containing the chemical mist and the like will pass along a second flow passage through the filter 10, which absorbs and collects the chemical mist and the like, and will return to the clean room 1 as pure, fresh air. It is therefore possible to prevent contaminated air from returning to in the clean room 1.

At present, in some cases a filter for removing harmful substances is always attached to the return opening of the circulating air conditioner. This, however, causes deterioration of the filter. As a result in a conventional arrangement, it is impossible to take countermeasures against large-scale chemical or gas leakage. However, it is possible to take countermeasures against large-scale chemical leakage and the like by using the air conditioning apparatus according to the present invention, because a new filter 10 for removing harmful substances always removes chemical mist and the like when they leak.

Though the operation of the shutters 11 is interlocked with the chemical mist detector 13 in the embodiment described above, it is also possible to manually operate the shutters 11 at the option of the worker.

Figure 4A:
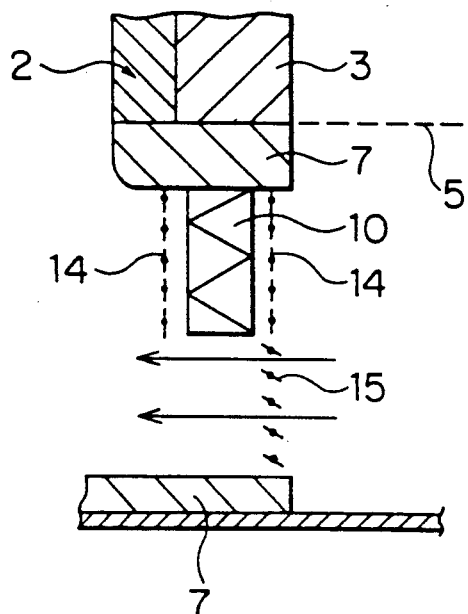
Figure 4B:
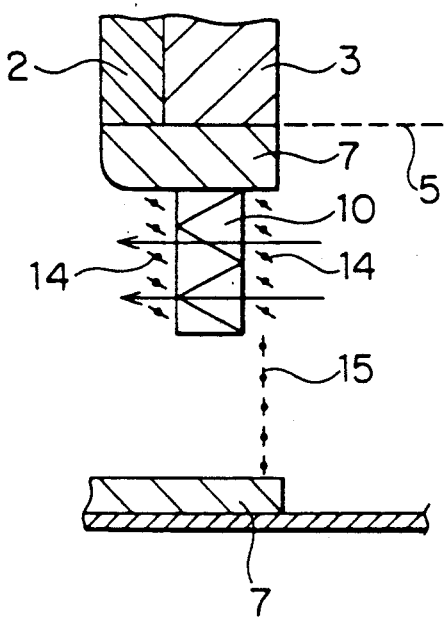

Further, although the system in which the shutters 11 move in an up and down direction is explained in the above-mention embodiment, the shutters 11 may be made to move horizontally. Furthermore, as illustrated in FIGS. 4A and 4B, under normal operating conditions, by using rotary shutters 14, 15 comprised of a number of louvers, air is not permitted to pass through the filter 10, thereby causing the air to pass only through the open shutter 15. When chemicals and the like leak, shutter 15 is made to close and shutter 14 is made to open in order that the air containing the chemicals pass through the filter 10. This also brings about the same effect as that of the previously described embodiment.

Although, though an explanation has been given of the leakage of chemicals and the like in a clean room, the present invention is also effective against leakage of toxic gases utilized for semiconductor materials, corrosive gases, and the like. Instead of a filter utilizing activated carbon as an agent for removing harmful substances, filters utilizing other types of agents may also be utilized. For instance, activated carbon is preferably used as an agent for organic solvents (alcohol, acetone, benzene, xylene, etc.); ferric chloride is preferably used for arsine ($AsH_3$), phosphine ($PH_3$), etc; and sintered magnesium is preferably used for boron trichoride ($BCl_3$), silicon tetrachloride ($SiCl_4$), etc.

Figure 5:
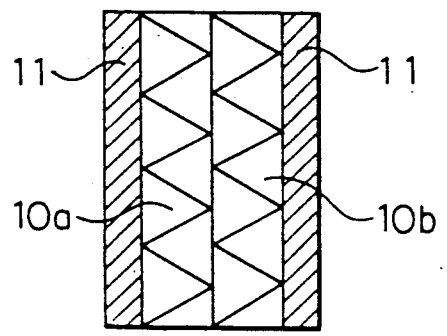
FIG. 5 is a cross-sectional view of filter for removing harmful substances in accordance with a further embodiment of the present invention.

Further, as illustrated in FIG. 5, although a filter 10 utilizing a single type of agent is disclosed, filters 10a, 10b utilizing a plurality of agents may be arranged in series in order to remove a plurality of chemicals and the like.

In the above description, although a filter for removing harmful substances is used only when chemicals and the like leak, a similar filter 21 may also be attached to the air conditioning apparatus at all times as shown in FIGS. 2A and 2B, thereby further improving the removal of harmful substances.

As has been explained, according to the present invention, a filter for removing harmful substances is provided in the return opening of an air conditioner. Although circulating air does not pass through the filter during normal operation, once chemicals and the like leak, the circulating air is made to pass through the filter by operating the shutters in order to remove chemical mist and the like contained in the circulating air. It is therefore possible to remove chemical mist and the like by a new filter, whenever the chemicals and the like leak in the clean room. Further, it is possible to take countermeasures against large-scale chemical leakage and the like.

As many widely different embodiments of the present invention can be made without departing from the spirit and scope thereof, it is to be understood that the invention is not limited to the specific embodiments thereof except as defined in the appended claims.

What is claimed is:

1. An air conditioning apparatus for a clean room comprising:
    an air conditioner for circulating air;
    a supply duct for guiding air from the air conditioner into a clean room;
    a return duct for guiding air from the clean room to the air conditioner;
    a filter provided in the return duct for removing a prescribed chemical from air;
    a chemical sensor for detecting the presence of the prescribed chemical in air from the clean room;
    a shutter disposed in the return duct and movable between a first position allowing air from the clean room to pass through the return duct without passing through the filter and a second position allowing air from the clean room to pass through the return duct by passing through the filter; and
    shutter operating means responsive to the chemical sensor for moving the shutter from the first position to the second position when the chemical sensor detects the prescribed chemical.

2. An apparatus according to claim 1 wherein the chemical sensor comprises a chemical mist detector;

3. An apparatus according to claim 1 wherein the filter comprises at least one substance selected form activated carbon, ferric chloride and sintered magnesium.

4. An apparatus according to claim 1 comprising a plurality of filters for removing different chemicals form air arranged in series in the return 5. An apparatus according to claim 1 wherein the shutter is movable up and down between the first and second positions.

6. An apparatus according to claim 1 wherein the shutter is movable horizontally between the first and second positions.

7. An apparatus according to claim 1 wherein the shutter comprises a plurality of rotatably supported louvers disposed in the return duct.

8. An apparatus according to claim 1 wherein the shutter prevents air from flowing through the return duct by flowing through the filter when the shutter is in its first position and prevents air from flowing through the return duct without passing through the filter when the shutter is in its second position.

9. An air conditioning apparatus for a room comprising:
    an air conditioner;
    a duct system comprising a supply duct and a return duct connected between the air conditioner and the room;
    a first filter disposed int he duct system for removing a prescribed chemical from air;
    a chemical sensor for sensing the prescribed chemical in air from the room; and
    flow control means for switching air flow through the duct system in response to the operation of the chemical sensor between a first flow passage in the duct system not passing through the first filter and a second flow passage int eh duct system passing through the first filter.

10. An air conditioning apparatus as claimed in claim 9 wherein the first filter and the flow control means are disposed in the return duct.

11. An air conditioning apparatus as claimed in claim 9 wherein the flow control means switches flow to the first flow passage when the chemical sensor detects the prescribed chemical and switches flow to the second flow passage when the contaminant sensor does not detect the prescribed chemical.

12. An air conditioning apparatus as claimed in claim 9 wherein the chemical detector comprises a chemical mist detector.

13. An air conditioning apparatus as claimed in claim 9 wherein the first filter comprises a substance selected form activated carbon, ferric chloride, and sintered magnesium.

14. An air conditioning apparatus as claimed in claim 9 wherein:
the first filter has an upstream side and a downstream side; and
the flow control means comprises a first shutter disposed on the upstream side of the first filter and movable between a first position in which it closes the first flow passage and opens the second flow passage and a second position in which it closes the second flow passage and opens the first flow passage.

15. An air conditioning apparatus as claimed in claim 9 wherein:
the first filter has an upstream side and a downstream side; and
the flow control means comprises a first shutter disposed on the upstream side and a second shutter disposed on the downstream side of the first filter, the first and second shutters moveable together between a first position in which they close the first flow passage and open the second flow passage and a second position in which the close the second flow passage and open the first flow passage.

16. An air conditioning apparatus as claimed in claim 9 wherein:
the flow control means comprises a first shutter and a second shutter rotatably mounted in the duct system upstream of the first filter;
the first shutter is rotatable between an open position and a closed position in which it respectively permits and prevents flow through the first flow passage;
the second shutter is rotatable between an open position and a closed position in which it respectively permits and prevents flow through the second flow passage; and
the first shutter is open when the second shutter is closed and the first shutter is closed when the second shutter is open.

17. An air conditioning apparatus as claimed in claim 16 further comprising a third shutter rotatably mounted in the duct system downstream of the first filter and rotatable together with the second shutter between an open position and a closed position in which it respectively permits and prevents flow through the second flow passage.

18. An air conditioning apparatus as claimed in claim 9 further comprising a second filter for removing the prescribed chemical disposed int he duct system in a position such that air flowing through the duct system can flow through the second filter regardless of the operating state of the flow control means.

* * * * *

UNITED STATES PATENT AND TRADEMARK OFFICE
CERTIFICATE OF CORRECTION

PATENT NO. : 5,053,064

DATED : OCTOBER 1, 1991

INVENTOR(S) : HAMA ET AL

It is certified that error appears in the above-identified patent and that said Letters Patent is hereby corrected as shown below:

```
Column 4, line 16, after "detector" insert --.--
         line 18, change "form" to --from--;
         line 23, change "form" to --from--;
                  after "return" insert --duct.--;
         line 45, change "int he" to --in the--;
         line 53, change "int eh" to --in the--.
Column 5, line 1, change "form" to --from--.
```

Signed and Sealed this

Twenty-first Day of June, 1994

*Attest:*

BRUCE LEHMAN

*Attesting Officer*  Commissioner of Patents and Trademarks